United States Patent
Lovelock et al.

(10) Patent No.: US 9,659,422 B2
(45) Date of Patent: May 23, 2017

(54) USING TEMPORARY ACCESS CODES

(71) Applicant: ASSA ABLOY AB, Stockholm (SE)

(72) Inventors: Julian Eric Lovelock, Pleasanton, CA (US); Daniel Berg, Sundbyberg (SE); Mark Robinton, West Lebanon, NH (US)

(73) Assignee: Assa Abloy AB, Stockholm (SE)

( * ) Notice: Subject to any disclaimer, the term of this patent is extended or adjusted under 35 U.S.C. 154(b) by 0 days.

(21) Appl. No.: 14/440,621

(22) PCT Filed: Nov. 12, 2013

(86) PCT No.: PCT/US2013/069636
§ 371 (c)(1),
(2) Date: May 5, 2015

(87) PCT Pub. No.: WO2014/075056
PCT Pub. Date: May 15, 2014

(65) Prior Publication Data
US 2015/0254915 A1    Sep. 10, 2015

Related U.S. Application Data

(60) Provisional application No. 61/724,550, filed on Nov. 9, 2012.

(51) Int. Cl.
*G05B 23/00* (2006.01)
*G07C 9/00* (2006.01)
(Continued)

(52) U.S. Cl.
CPC ..... *G07C 9/00142* (2013.01); *G07C 9/00015* (2013.01); *G07C 9/00166* (2013.01); *H04W 4/008* (2013.01); *H04W 12/08* (2013.01)

(58) Field of Classification Search
CPC ............ G07C 9/00166; G07C 9/00039; G07C 9/00142
(Continued)

(56) References Cited

U.S. PATENT DOCUMENTS 5,600,324 A    2/1997    Reed et al.
6,073,064 A    6/2000    Konrad et al.
(Continued)

OTHER PUBLICATIONS

U.S. Appl. No. 14/949,942, filed Nov. 24, 2015, Micali, et al.
U.S. Appl. No. 15/238,852, filed Aug. 17, 2016, Libin, et al.

*Primary Examiner* — Kevin Kim
(74) *Attorney, Agent, or Firm* — Muirhead and Saturnelli, LLC (57) ABSTRACT

Managing access by a user includes requesting an access code from an external server, the external server providing the access code to the user only if the user is authorized for access, the access code being provided to an input unit, and the user being granted access by a security component if the access code is valid. The input unit may be a keypad. The access code maybe provided using RF communication, such as NFC, Bluetooth, and/or Bluetooth Smart. The device may request the access code from the external server. The device may be a mobile device. Managing access by a user may also include the user entering a PIN in addition to the access code. The pin may be entered by the user's device. The access may be to a physical area and the user may be granted access by having a door open.

23 Claims, 4 Drawing Sheets

(51) Int. Cl.
*H04W 4/00* (2009.01)
*H04W 12/08* (2009.01)

(58) Field of Classification Search
USPC .... 340/5, 2, 5.21, 5.52, 5.54, 5.73, 5.8, 5.81
See application file for complete search history.

(56) References Cited

U.S. PATENT DOCUMENTS

| | | | |
|---|---|---|---|
| 7,205,882 | B2 | 4/2007 | Libin |
| 7,266,507 | B2 | 9/2007 | Simon et al. |
| 7,353,396 | B2 | 4/2008 | Micali et al. |
| 7,600,129 | B2 | 10/2009 | Libin et al. |
| 7,616,091 | B2 | 11/2009 | Libin |
| 7,660,994 | B2 | 2/2010 | Libin et al. |
| 7,716,486 | B2 | 5/2010 | Libin et al. |
| 7,822,989 | B2 | 10/2010 | Libin et al. |
| 8,015,597 | B2 | 9/2011 | Libin et al. |
| 8,171,524 | B2 | 5/2012 | Micali et al. |
| 8,261,319 | B2 | 9/2012 | Libin et al. |
| 9,158,288 | B2 | 10/2015 | Libin et al. |
| 9,230,375 | B2 | 1/2016 | Micali et al. |
| 9,449,443 | B2 | 9/2016 | Libin et al. |
| 2007/0096870 | A1* | 5/2007 | Fisher ................ E05B 19/0005 340/5.53 |
| 2009/0324025 | A1 | 12/2009 | Camp, Jr. et al. |
| 2011/0271331 | A1 | 11/2011 | Adams |
| 2011/0311052 | A1 | 12/2011 | Myers et al. |
| 2012/0220216 | A1 | 8/2012 | Carbonell Duque et al. |
| 2012/0221473 | A1 | 8/2012 | Redmann et al. |
| 2013/0237193 | A1* | 9/2013 | Dumas ................ G07C 9/00571 455/414.1 |
| 2014/0375422 | A1* | 12/2014 | Huber ................ G07C 9/00174 340/5.61 |
| 2015/0170448 | A1* | 6/2015 | Robfogel ........... G07C 9/00904 340/5.61 |

* cited by examiner

USING TEMPORARY ACCESS CODES

CROSS-REFERENCE TO RELATED APPLICATIONS

This application claims priority to U.S. Prov. App. No. 61/724,550, filed Nov. 9, 2012, and entitled "USING TEMPORARY ACCESS CODES", which is incorporated herein by reference.

BACKGROUND OF THE INVENTION

1. Technical Field

This application relates to the field of physical access control, and more particularly to the field of access control using processor actuated locks and related data.

2. Description of Related Art

Ensuring that only authorized individuals can access protected areas and devices may be important in many instances, such as in the case of access to an airport, military installation, office building, etc. Traditional doors and walls may be used for protection of sensitive areas, but doors with traditional locks and keys may be cumbersome to manage in a setting with many users. For instance, once an employee is fired, it may be difficult to retrieve the physical keys the former employee was issued while employed. Moreover, there may be a danger that copies of such keys were made and never surrendered.

Smart doors provide access control. In some instances, a smart door may be equipped with a keypad through which a user enters his/her PIN or password. The keypad may have an attached memory and/or elementary processor in which a list of valid PINS/passwords may be stored. Thus, a door may check whether the currently entered PIN belongs to the currently valid list. If so, the door may open. Otherwise, the door may remain locked. Of course, rather than (solely) relying on traditional keys or simple keypads, a more modern smart door may work with cards (such as smart cards and magnetic-strip cards) or contactless devices (e.g., PDA's, mobile phones, etc.). Such cards or devices may be used in addition to or instead of traditional keys or electronic keypads. Such magnetic-strip cards, smart cards or contactless devices, designed to be carried by users, may have the capability of storing information that is transmitted to the doors. More advanced cards may also have the ability of computing and communicating. Corresponding devices on the doors may be able to read information from the cards, and perhaps engage in interactive protocols with the cards, communicate with computers, etc.

An aspect of a door is its connectivity level. A fully connected door is one that is at all times connected with some database (or other computer system). For instance, the database may contain information about the currently valid cards, users, PINs, etc. In some instances, to prevent an enemy from altering the information flowing to the door, such connection is secured (e.g., by running the wire from the door to the database within a steel pipe). On the other hand, a totally disconnected door does not communicate outside of its immediate vicinity. In between these two extremes, there may be doors that have intermittent connectivity (e.g., a wirelessly connected door that can communicate with the outside only when within range of a ground station, such as the door of an airplane or a truck).

Traditional access control mechanisms suffer from many drawbacks. Fully connected doors may be very expensive. The cost of running a secure pipe to a distant smart door may vastly exceed the cost of the smart door itself. Protecting a wire cryptographically, while possibly cheaper, still has its own costs (e.g., those of protecting and managing cryptographic keys). Moreover, cryptography without steel pipes and security guards cannot prevent a wire from being cut, in which case the no-longer-connected door may be forced to choose between two extreme alternatives: namely, remaining always closed or always open, neither of which may be desirable. In any case, fully connecting a door is often not a viable option. (For instance, the door of a cargo container below sea level in the middle of the Atlantic Ocean is for all practical purposes totally disconnected.)

Disconnected smart doors may be cheaper than connected doors. However, traditional approaches to smart doors have their own problem. Consider, for instance, a disconnected smart door capable of recognizing a PIN. A terminated employee may no longer be authorized to go through that door; yet, if he still remembers his own PIN, he may have no trouble opening such an elementary smart door. Therefore, it would be necessary to "deprogram" the PINs of terminated employees, which is difficult for disconnected doors. Indeed, such a procedure may be very cumbersome and costly: an airport facility may have hundreds of doors, and dispatching a special team of workers to go out and deprogram all of such doors whenever an employee leaves or is terminated may be too impractical.

Accordingly, it is desirable to provide a level of security associated with fully connected doors without incurring the additional costs and other drawbacks thereof.

SUMMARY OF THE INVENTION

According to the system described herein, managing access by a user includes requesting an access code from an external server, the external server providing the access code to the user only if the user is authorized for access, the access code being provided to an input unit, and the user being granted access by a security component if the access code is valid. The input unit may be a keypad. The access code may be provided using RF communication from a device. The RF communication may be NFC, Bluetooth, or Bluetooth Smart. The device may be a mobile device. The device may request the access code from the external server. Managing access by a user may also include the user entering a PIN in addition to the access code. The user may enter the PIN via a mobile device. The access may be to a physical area and the user may be granted access by having a door open. The external server may determine the access code independently of the security component. The access code may depend, at least in part, on a time. Access codes may be pseudo-random so that a prior access code may not be used to predict a future access code. The access may be to a machine and the user may be granted access by the machine turning on.

According further to the system described herein, computer software, provided in a non-transitory computer-readable medium, manages access by a user. The software includes executable code that requests an access code from an external server, executable code that receives the access code from the external server, where the external server provides the access code only if the user is authorized for access, and executable code that provides the access code to an input unit, where the user is granted access by a security component if the access code is valid. The access code may be provided using RF communication from a device. The RF communication may be NFC, Bluetooth, or Bluetooth Smart. The device may be a mobile device. The device may request the access code from the external server. The software may also include executable code that receives a PIN from the user in addition to the access code. The user may enter the PIN via a mobile device. The access may be to a physical area and the user may be granted access by having a door open. The external server may determine the access code independently of the security component. The access code may depend, at least in part, on a time. Access codes may be pseudo-random so that a prior access code may not be used to predict a future access code. The access may be to a machine and the user may be granted access by the machine turning on.

The system described herein provides an alternative method under which a traditional permanent or semi-permanent access credential is replaced with a temporary access code that is recognized by an access point (e.g. a door) as being valid for a specific time window. The temporary access code is sent to an authorized user in anticipation of or in response to a request for access.

The system described herein offers two benefits. Firstly, using the temporary access code substantially reduces the requirements to otherwise secure a more permanent access code. Theft of the temporary access code only results in compromise of the access point for the limited time window. Secondly, using the temporary access code removes the need for the access point to connect to an access control system in order to determine whether the user is authorized to have access. This is because temporary access codes may only be issued to authorized users.

DETAILED DESCRIPTION OF VARIOUS EMBODIMENTS

It is possible to provide a system to control physical access to an area using a smart door (and/or smart virtual door, see description elsewhere herein). A smart door may verify that the person entering is currently authorized to do so. It may be advantageous to not have to provide the door with credentials of every possible authorized user. For example, an organization may have tens of thousands of employees and hundreds or even thousands of doors, making it impractical to provide specific credentials for each of the authorized users for each of the doors. Frequently scheduled updates (to account for new users, fired employees, etc.) may make this even more impractical. However, scheduling updates less frequently may result in the system being less secure since it will take longer for the door(s) to be alerted when a user's access has been revoked (e.g., when the user is terminated).

A smart door may grant access to a user that presents an appropriate temporary access code. The temporary access code may be changed periodically so that an access code that is valid at a first time, T1, may no longer be valid at a second time, T2 (i.e., may expire). This prevents a user from improperly maintaining his or her access beyond a time that the user is supposed to be authorized. For example, an employee that had been given an access code may be terminated. In such a case, it is desirable that the employee's access code(s) expire as soon as possible. In an embodiment, access codes expire every half hour, although other expiration times may be used (e.g., every day).

The user may use the temporary access code in any one or more of a number of ways. The access code may include a PIN or password, entered at a keypad associated with the door or communicated to the door by a user's smart card, phone, or other user device. In some embodiments, the access code may be used in combination with information that identifies a particular user, such as a separate alphanumeric identifier, biometric information, a smart card, a PIN (or similar), etc.

Figure 1:
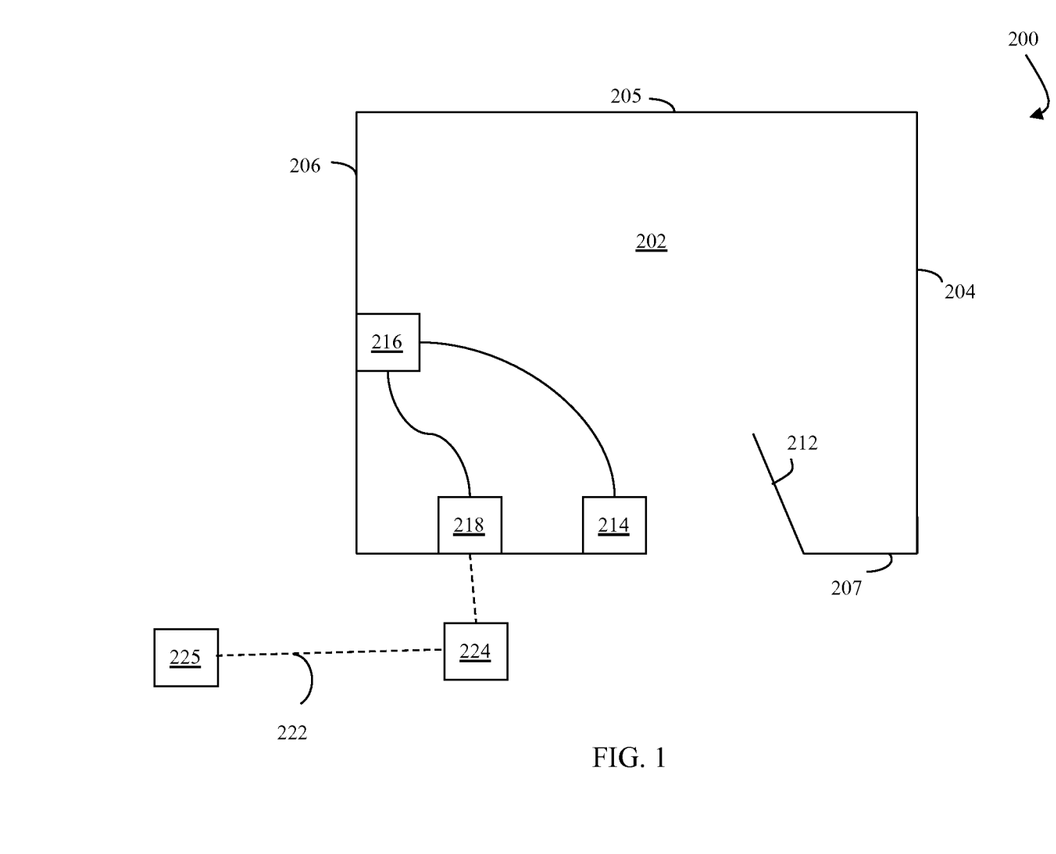
FIG. 1 is a diagram illustrating a system that includes an area in which access thereto is to be restricted according to the system described herein.

Referring to FIG. 1, a diagram illustrates a system 200 that includes a protected area 202 in which physical access thereto is to be restricted. The area 202 is enclosed by a plurality of walls 204-207. The wall 207 has a door 212 therein for providing egress to the area 202. In other embodiments, more than one door may be used. The walls 204-207 and the door 212 provide a barrier to access to the area 202. The door 212 may be locked using an electronic lock 214, which prevents the door 212 from opening unless and until the electronic lock 214 receives an appropriate signal. The electronic lock 214 may be implemented using any appropriate elements that provide the functionality described herein, including, without limitation, using off-the shelf electronic locks.

The electronic lock 214 may be coupled to a controller 216, which provides an appropriate signal to the electronic lock 214 to allow the door 212 to be opened. In some embodiments, the electronic lock 214 and the controller 216 may be provided in a single unit. The controller 216 may be coupled to an input unit 218, which may receive a temporary access code indicating that a user is currently authorized to enter the area 202. The input unit 218 may be any appropriate input device such as a key pad, an NFC reader, a Bluetooth receiver, etc. and/or a combination of multiple input devices, including possibly a biometric reader.

In some embodiments, a user may present a device 224 to the input unit 218. The device 224 may provide some user identification information and possibly access information. The device 224 may be a smart card, a PDA, a mobile device, etc. that provides data to the input unit 218. The device 224 may get some or all data from a transponder (not shown). In other instances, the device 224 may get data from other sources (not shown), such as a cellular network, a WiFi network, etc. In some instances, the device 224 may get at least some data from the input unit 218 (or some other mechanism associated with accessing the area 202), or some other appropriate source.

The device 224 may have an external connection 222 coupled to an external server 225. The external connection 222 may be used to transmit data between the external server 225 and the device 224. In some embodiments, the external connection 222 may include a general connection to a network, such as the World Wide Web, a cellular network, etc., in which case the external connection 222 may provide connectivity to more than just the external server 225.

The external connection 222 may be secure although, in some embodiments, the external connection 222 may not need to be secure. The external connection 222 may be used to transmit appropriate access and possibly logging information. Note that the external connection 222 may be intermittent so that, for example, at some times the external connection 222 provides connectivity to the device 224 while at other times there may be no external connection for the device 224. The external connection 222 may be a cellular network or a WiFI connection.

Figure 2:
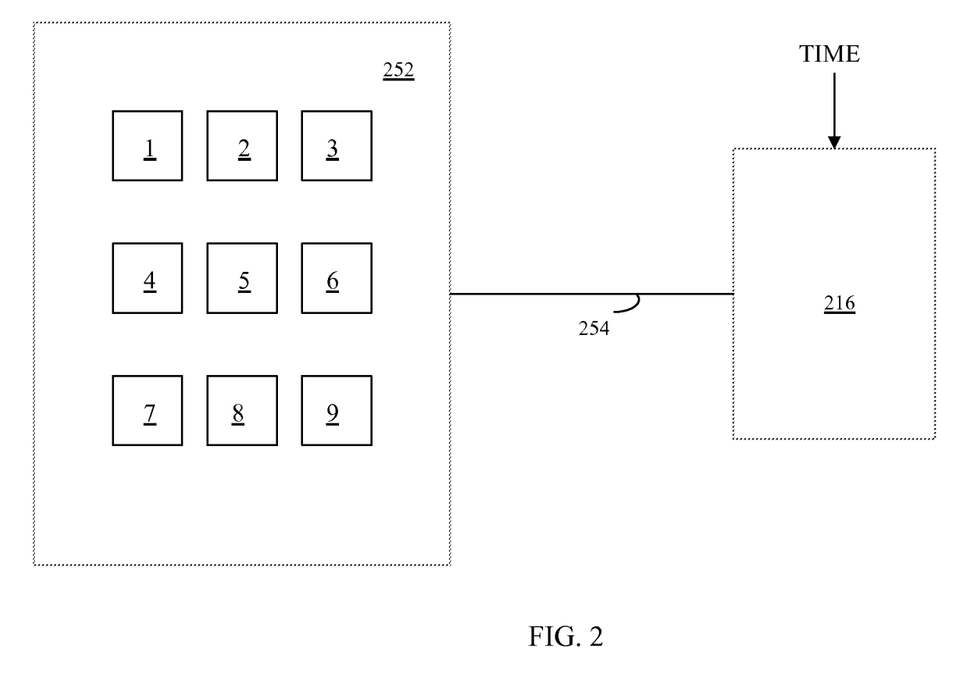
FIG. 2 is a diagram illustrating a keypad and a door controller according to the system described herein.

Referring to FIG. 2, a door (not shown in FIG. 2) includes a numeric keypad 252 and a connection 254 from the numeric keypad 252 to the door controller 216, discussed above. A user may enter a temporary access code at the keypad 252 to actuate the controller 216 to open the door. The keypad 252 may be a specific implementation of the input unit 218, discussed above, or may be an additional element that is separate from the input unit 218. The keypad 252 may include therein a unique symmetric key (for example Oath) deemed "the Reader Key" or "RK" for short. Alternatively, the RK may be provided in the door controller 216, the input unit 218, or in some other hardware and/or software item that is in communication with the door controller 216 and/or the input unit 218.

The Reader Key may be derived from a Master key (MK) and a unique serial number of the door controller 216, where the MK and/or the RK may be known by the external server 225. Instead of the serial number of the door controller 216, it is possible to use a serial number of a hardware and/or software item that is in communication with the door controller 216, such as a serial number of the input unit 218 and/or the keypad 252, discussed above. The controller 216 may receive a time input that is combined with the RK to determine a valid temporary access code for a particular period. In other embodiments, the controller 216, the input unit 218, and/or another related device may have a built in clock. Note that time, as used herein, time may include a time of day as well as date so that, for example, a temporary access code that is valid at a particular time on a particular date is not valid at any other date and time combination. In other embodiments, access codes may be reused either randomly or in a pattern (e.g., same time every day, same time every Wednesday, etc.). The access codes may be pseudo-random so that a past value of an access code may not be used to predict a future value of an access code.

In some embodiments, the temporary access codes may be determined independently at the external server 225 and at the door (e.g., by the controller 216, the input unit 218, etc.). The temporary access codes may be calculated using RK, MK, the time, and/or any other appropriate input. Thus, it is not necessary for the door and the external server 225 to communicate and agree on any temporary access codes. Instead, a user requests a temporary access code from the external server 225, which determines if the user is authorized and then provides the user with a temporary access code that the external server 225 calculates independently. In such a system, it is not necessary to store user authorization information at the door(s). Instead, it is assumed that a user is authorized if the external server 225 issues an access code to the user.

Figure 3:
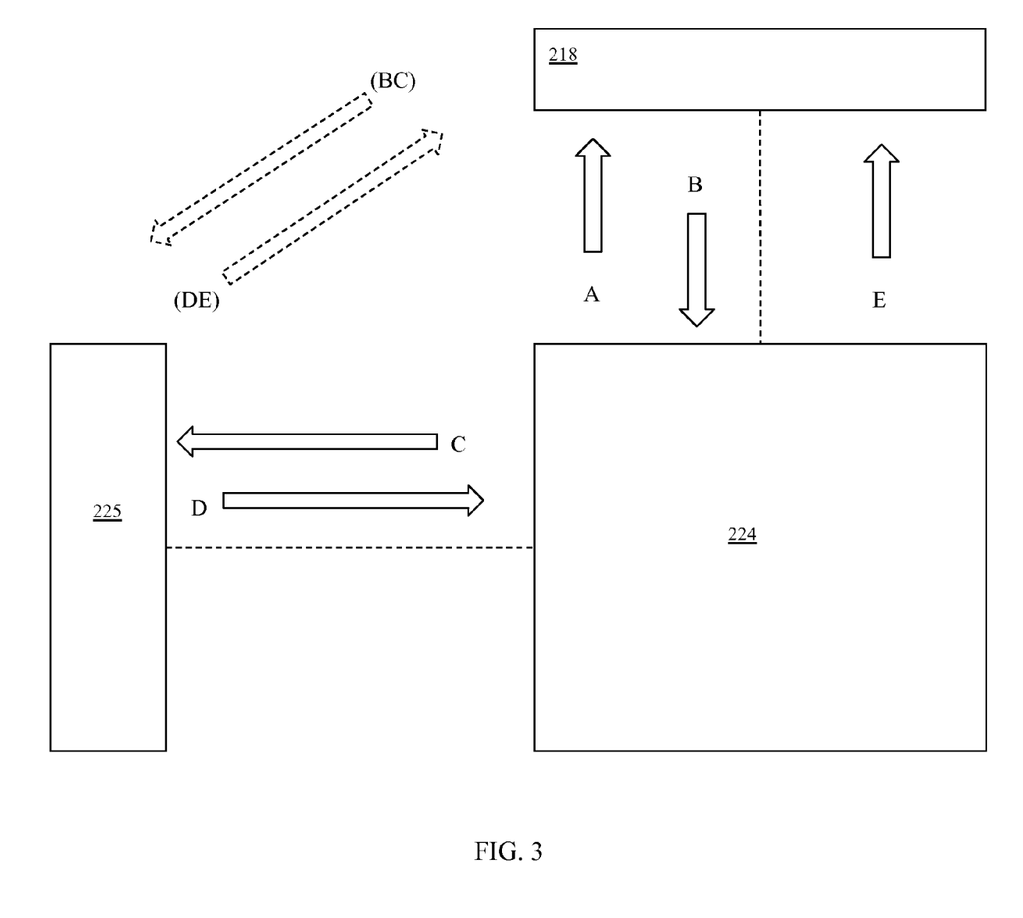
FIG. 3 is a diagram illustrating communication between a device, an external server, and an input unit in connection with obtaining access to an area according to the system described herein.

Referring to FIG. 3, the device 224 is shown in communication with the input unit 218 and the external server 225. The external server 225 may determine an access code for a given door by knowing MK, knowing or being able to derive RK for the given door, and knowing a serial number associated with the door or with a hardware and/or software in communication with the door. For example, the serial number may be a serial number of the controller 216 or of the input unit 218. As discussed elsewhere herein, the temporary access code may also be determined using the time.

The device 224 initially queries (A) the input unit 218 to determine information that indicates the specific door, such as a serial number, as described above. The device 224 may communicate with the input unit 218 using any appropriate mechanism, including having the device be a mobile device that uses RF communication such as NFC, Bluetooth, Bluetooth Smart, etc. to communicate with the input unit 218. The input unit 218 responds (B) to the query by providing the requested information to the device 224.

Subsequently, the device 224 provides (C) the door identifying information (or other data derived therefrom) to the external server 225, which determines if the corresponding user (i.e., the owner of the device 224) is authorized to access through the particular door. The communication from the device 224 to the external server 225 may be in the form of s text message. Thus, it is the external server 225 that maintains an up-to-date list of authorized users and the particular door(s) through which the users are allowed. In some embodiments, the initial query may be provided by an administrator who may log on to a portal to make the request. In some embodiments, whenever the external server 225 receives a request for access, a log entry (e.g., a data string) is created containing information about the event, such as the time of request, the type of request (if more than one type of request is possible—for example, if the request is for exit or for entry), the device that made the request, whether the request was successful, etc. Log entries may also contain operational data or information on any unusual events, such as current or voltage fluctuations, sensor failures, switch positions, etc.

Note that, in some embodiments, the input unit 218 (and/or the controller 216 and/or other door components) may be configured to communicate directly with the external server 225 so that the (B) and (C) transfers shown in FIG. 3 may be replaced with a direct communication (BC) between the input unit 218 and the external server 225, illustrated by a dashed arrow between the input unit 218 and the external server 255. In some cases, it may not be necessary to specifically identify a particular door, either because the system simultaneously grants access to all doors (e.g., the same access code grants access to all doors) or because it is possible to use a different mechanism to determine which door is being access by the device 224 (e.g., a GPS system provided with the device 224).

If the external server 225 determines that the user (i.e., owner/user of the device 224) should be granted access through the door, then the external server 225 transmits (D) an access code to the device 224. In some embodiments, the external server 225 may maintain an audit trail of which users have requested access to specific doors at specific times. In some instances, specific users may be granted access through specific doors only at certain times. For example, a maintenance worker may be allowed access through a door to a room containing tools only during the time of day that the maintenance worker is supposed to be at the facility.

After receiving the access code, the user may then provide (E) the access code to the input unit 218, which causes the door to open. In some embodiments, the user may read the access code on the device 224 (e.g., read a number on a mobile device) and then enter the access code at a keypad, like the keypad 252 discussed above. The access code may be sent as a text message and/or over an Internet connection.

Alternative, the device may transmit the access code directly to the input unit 218 with little or no user involvement using, for example, NFC or Bluetooth communication. In some instances, the access code may be supplemented with a PIN (or similar) value entered by a user to confirm that the register owner/user of the device 224 is actual user requesting access. The expected PIN (or similar) may be encoded by the external server 225 as part of the access code provided by the external server 225. Thus, access through the door may only be granted upon entry of both the proper access code and the correct PIN (or similar). In some embodiments, the PIN (or similar) may be used as part of the access request to the external server. The user may enter the PIN (or similar) at the keypad 252 or by using the device 224 if, for example, the device is a mobile device (e.g., mobile phone, ipad, etc.) or similar.

A door component or combination of components may act as security components that grant or deny access at the door after receiving the temporary access code. In some embodiments, the input unit 218 may provide security component functionality while in other embodiments the controller 216 may provide security component functionality. In other embodiments other components or combinations of components may provide security component functionality at the door.

Figure 4:
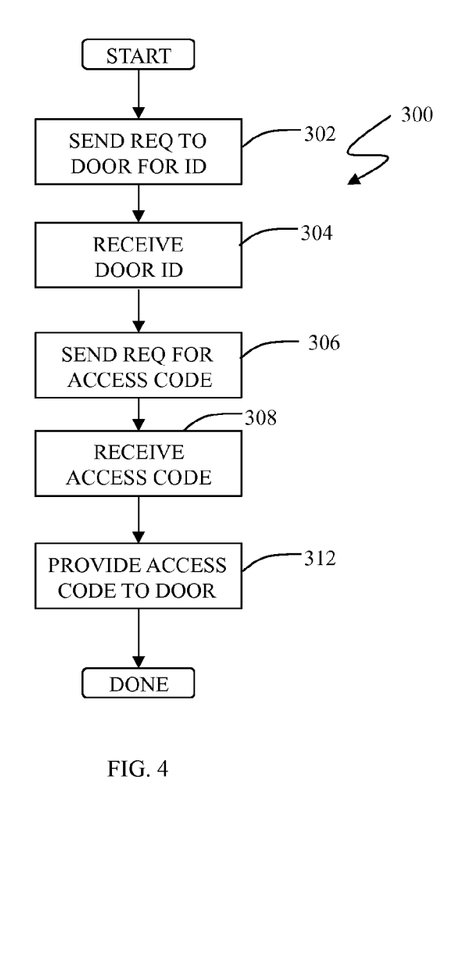
FIG. 4 is a flow diagram illustrating processing performed by a device in connection with obtaining access to an area according to the system described herein.

Referring to FIG. 4, a flow diagram 300 illustrates processing performed by the device 224 in connection with obtaining access through a door. Processing begins at a first step 302 where the device 224 sends a request to the door (the input device 218 of the door) to obtain identification information for the door. As discussed elsewhere herein, in some instances, this may be omitted under some circumstances. Following the step 302 is a step 304 where the device 224 receives the request door id. Following the step 304 is a step 306 where the device sends a request to the external server 225 for an access code. As discussed elsewhere herein, the request may include the door id and possibly a user PIN (or similar). Following the step 306 is a step 308 where the device 224 receives the requested access code from the external server (assuming that the owner/user of the device should be allowed the requested access). Following the step 308 is a step 312 where the device (and/or the user) provides the access code to the door to gain access. As discussed elsewhere herein, a PIN (or similar) may also be used.

Figure 5:
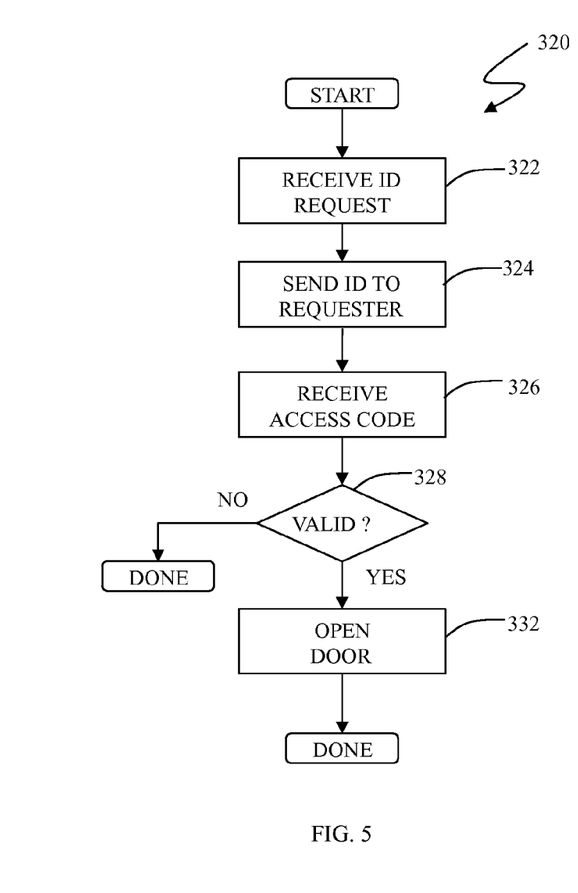
FIG. 5 is a flow diagram illustrating processing performed by a door system in connection with obtaining access to an area according to the system described herein.

Referring to FIG. 5, a flow diagram 320 illustrates processing performed at the door in connection with interacting with a user/device 224 to grant (or deny) access. The processing illustrated by the flow diagram 320 may be performed by one or more components of the door system, such as the input unit 218, the controller 216, etc. Processing begins at a first step 322 where a request for a door id is received (e.g., from the device 224). Following the step 322 is a step 324 the requested id information is returned. Following the step 324 is a step 326 where the door receives an access code (also possibly from the device 224), which may have been previously obtained from the external server. Following the step 326 is a test step 328 where it is determined if the received access code is valid, as discussed in more detail elsewhere herein. If not, processing is complete and the door is not opened. Otherwise, control transfers from the test step 328 to a step 332 where the door is opened by, for example, providing an appropriate signal to the door controller. Following the step 332, processing is complete.

In some embodiments, a key management component may be added to enable cryptographic keys used by the system to be changed periodically, in line with cryptographic best practices. Key updates may be delivered via mobile devices of the users, where the key updates are protected using a pre-established transport key. An initial bootstrap mechanism may be provided that enables an installer to initialize the key material within the system (i.e., with a particular door controller 216 or input device 218) using a bootstrap key card or mobile device with secure element.

The system described herein may leverage third party mobile wallets, such as Apple's Passbook, to securely retrieve and present access codes by modeling the access codes as recognized objects (i.e., electronic tickets) within the Apple Passbook application. In such a case, the reader may be a bar code reader. The system described herein may work in conjunction with a virtual credential and/or an NFC phone and/or a phone that uses Bluetooth/Bluetooth Smart.

In scenarios where multiple parties are required in order for access to be granted (for example, two individuals must be present in order to open a safety deposit box), the centralized service could generate component (partial) access codes that may be combined to generate a useable access code, where no access is granted by the component access codes alone or combined with less than all (or some number) of the other component access codes. The component access codes could then be sent to the parties. The parties would enter the component access codes individually and combined within the system to generate a complete access code which could then be validated.

In another embodiment, a one time password (OTP) could be used instead of a PIN for access control of either offline locks (residential) or key pad readers. In some cases, a user could generate a fresh one time password using a phone, a token, or other OTP generators and enter the OTP into the key pad along with the user's PIN (or similar) in a manner like that used for VPN access. The PIN and OTP may be sent by the input unit 218 (or some other intermediary device) to an authentication server for validation of the OTP. In other cases, the interface of the lock could generate a challenge for the user to enter into an OTP application or token. The response would then be keyed into the PIN pad and validated by the lock.

The system described herein could be used for residential locks or HID key pad readers and could take advantage of managed authentication service.

Note that, generally, protected areas may be defined by walls and physical doors, such as doors through which a human may enter, or doors of a container, of a safe, of a vehicle, etc. Protected areas may also be defined by virtual doors and walls. For instance, an area may be protected by a detector that can sense an intrusion, and possibly sound an alarm or send another signal if authorization is not provided. Such an alarm system is an example of a virtual door: in an airport, often entering the gate area through an exit lane will trigger such an alarm, even though no physical doors or walls have been violated. Another example of a virtual door is a toll booth: even though many toll booths contain no physical bars or doors, a given car may or may not be authorized to go through the booth. Such authorization may depend, for instance, on the validity of a car's electronic toll billing token. Yet another example is that of a traffic control area. For instance, to enter the downtown of a given city, or a road leading to a nuclear facility, an army barrack, or another sensitive area, a vehicle must have proper authorization, for purposes such as billing, security or congestion control. In addition, protection may not be needed only for areas, but also for devices, such as airplane engines or military equipment. For instance, it may be necessary to ensure that only an authorized individual can start the engines of an airplane or of a truck carrying hazardous materials.

Throughout this application, "doors" should be construed to include all types of portals (e.g., physical and/or virtual), access-control systems/devices, and monitoring systems/devices. In particular, they include key mechanisms used to start engines and control equipment (so that the system described herein, in particular, can be used to ensure that only currently authorized users may start a plane, operate an earth-mover or otherwise access and control various valuable and/or dangerous objects, devices and pieces of machinery). Thus, the system described herein should be considered as applicable to controlling any type of restriction to an area or system.

Similarly, the device 224 described herein may be understood to mean any access device of a user. It should be understood that the device 224 includes cellular phones, PDAs, and other wireless and/or advanced devices and/or mobile devices, including a smart card, and may include or operate in conjunction with other security measures, such as PINs, password and biometrics.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screens described in screen layouts may vary from the illustrations presented herein. Further, various aspects of the system described herein may be implemented using software, hardware, a combination of software and hardware and/or other computer-implemented modules or devices having the described features and performing the described functions.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of managing access by a user, comprising:
   requesting an access code from an external server;
   the external server providing the access code to the user only if the user is authorized for access;
   the access code being provided to an input unit; and
   the user being granted access by a security component if the access code is valid, wherein the security component determines validity of the access code without accessing any user authorization information, wherein the access code is based, at least in part, on a master key at the external server and wherein the security component determines validity of the access code using a unique symmetric key that is derived from the master key and wherein the unique symmetric key is derived from the master key in combination with one of: a serial number of the security component and a serial number of a component associated with the security component.

2. A method, according to claim 1, wherein the input unit is a keypad.

3. A method, according to claim 1, wherein the access code is provided using RF communication from a device.

4. A method, according to claim 3, wherein the RF communication is one of: NFC, Bluetooth, or Bluetooth Smart.

5. A method, according to claim 3, wherein the device is a mobile device.

6. A method, according to claim 3, wherein the device requests the access code from the external server.

7. A method, according to claim 1, further comprising:
   the user entering a PIN in addition to the access code.

8. A method, according to claim 7, wherein the PIN is entered via a mobile device.

9. A method, according to claim 1, wherein the access is to a physical area and the user is granted access by having a door open.

10. A method, according to claim 1, wherein the access code depends, at least in part, on a time.

11. A method, according to claim 1, wherein access codes are pseudo-random so that a prior access code may not be used to predict a future access code.

12. A method, according to claim 1, wherein the access is to a machine and the user is granted access by the machine turning on.

13. A non-transitory computer-readable medium containing software that manages access by a user, the software comprising:
   executable code that requests an access code from an external server;
   executable code that receives the access code from the external server, wherein the external server provides the access code only if the user is authorized for access; and
   executable code that provides the access code to an input unit, wherein the user is granted access by a security component if the access code is valid, wherein the security component determines validity of the access code without accessing any user authorization information, wherein the access code is based, at least in part, on a master key at the external server and wherein the security component determines validity of the access code using a unique symmetric key that is derived from the master key and wherein the unique symmetric key is derived from the master key in combination with one of: a serial number of the security component and a serial number of a component associated with the security component.

14. A non-transitory computer-readable medium, according to claim 13, wherein the access code is provided using RF communication from a device.

15. A non-transitory computer-readable medium, according to claim 14, wherein the RF communication is one of: NFC, Bluetooth, or Bluetooth Smart.

16. A non-transitory computer-readable medium, according to claim 14, wherein the device is a mobile device.

17. A non-transitory computer-readable medium, according to claim 14, wherein the device requests the access code from the external server.

18. A non-transitory computer-readable medium, according to claim 13, further comprising:

executable code that receives a PIN from the user in addition to the access code.

19. A non-transitory computer-readable medium, according to claim 18, wherein the PIN is entered via a mobile device.

20. A non-transitory computer-readable medium, according to claim 13, wherein the access is to a physical area and the user is granted access by having a door open.

21. A non-transitory computer-readable medium, according to claim 13, wherein the access code depends, at least in part, on a time.

22. A non-transitory computer-readable medium, according to claim 13, wherein access codes are pseudo-random so that a prior access code may not be used to predict a future access code.

23. A non-transitory computer-readable medium, according to claim 13, wherein the access is to a machine and the user is granted access by the machine turning on.

* * * * *